United States Patent
Corona et al.

(10) Patent No.: US 12,301,669 B2
(45) Date of Patent: May 13, 2025

(54) DEFAULT BEARER USE FOR MULTIMEDIA SESSIONS IN WIRELESS COMMUNICATION NETWORKS

(71) Applicant: T-MOBILE INNOVATIONS LLC, Overland Park, KS (US)

(72) Inventors: A. Karl Corona, Maple Valley, WA (US); Nassereddine Sabeur, Bellevue, WA (US); Joel Lee Arends, Renton, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/449,153

(22) Filed: Aug. 14, 2023

(65) Prior Publication Data
US 2025/0063092 A1    Feb. 20, 2025

(51) Int. Cl.
*H04L 67/14* (2022.01)

(52) U.S. Cl.
CPC .................... *H04L 67/14* (2013.01)

(58) Field of Classification Search
CPC ............................ H04L 67/14; H04L 65/1069
See application file for complete search history.

(56) References Cited

U.S. PATENT DOCUMENTS

| | | | |
|---|---|---|---|
| 9,191,265 B1 * | 11/2015 | McGinn | H04M 15/8228 |
| 10,123,372 B2 | 11/2018 | Sharma et al. | |
| 10,285,122 B2 | 5/2019 | Li | |
| 10,721,665 B2 | 7/2020 | Reddiboyana et al. | |
| 11,146,412 B2 | 10/2021 | Kaki et al. | |
| 11,483,684 B1 * | 10/2022 | Mirza | H04W 76/19 |
| 2020/0044879 A1 * | 2/2020 | Mirza | H04M 15/8228 |

FOREIGN PATENT DOCUMENTS

| | | | | |
|---|---|---|---|---|
| CA | 3156622 A1 * | 5/2021 | ......... | H04L 65/1016 |
| WO | 2022083552 A1 | 4/2022 | | |

* cited by examiner

*Primary Examiner* — Caroline H Jahnige

(57) ABSTRACT

Various embodiments comprise a wireless communication network to maintain multimedia sessions in response to bearer failure. In some examples, the wireless communication network comprises Call Session Control Function (CSCF) circuitry. The CSCF circuitry requests a dedicated bearer to serve a requested multimedia session in response to a multimedia session request for a user device received over a default bearer. The CSCF circuitry receives an error message that comprises an error code indicating the dedicated bearer could not be established. The CSCF circuitry determines when the default bearer can support the requested multimedia session based on the error code. The CSCF circuitry maintains the default bearer for the user device and establishes the requested multimedia session over the default bearer when the default bearer can support the requested multimedia session.

20 Claims, 11 Drawing Sheets

DEFAULT BEARER USE FOR MULTIMEDIA SESSIONS IN WIRELESS COMMUNICATION NETWORKS

TECHNICAL FIELD

Various embodiments of the present technology relate to Internet Protocol Multimedia Subsystem (IMS), and more specifically, to using default bearers for multimedia sessions in response to dedicated bearer failure.

BACKGROUND

Wireless communication networks provide wireless data services to wireless user devices. Exemplary wireless data services include voice calling, video calling, internet-access, media-streaming, online gaming, social-networking, and machine-control. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

Internet Protocol Multimedia Subsystem (IMS) supports Internet Protocol (IP) multimedia services like voice calling and video conferencing to wireless user devices. The IMS distributes IP addresses to the wireless user devices to facilitate communications between the wireless user devices. The IMS interfaces with wireless network cores to exchange Session Initiation Protocol (SIP) messages with the wireless user devices to communicate with the wireless user devices. The IMS comprises network functions and network elements like Call Session Control Function (CSCF) and Telephony Application Server (TAS).

When an originating (i.e., calling) wireless user device begins an IMS voice session with a terminating (i.e., called) user device, the originating user device transfers an invite message to the IMS using a default radio bearer. A radio bearer is a set of radio resources allocated to a user device that the user device uses to communicate with the network. The IMS routes the invite message to the terminating user device. If the terminating user device accepts the call, the IMS organizes the end-to-end connection between the calling and called user devices.

To set up the end-to-end connection, the IMS requests the creation of a dedicated radio bearer from the network core. Dedicated radio bearers are used to support specific sessions like voice calls, data sessions, and the like and typically comprise more radio resources than the default radio bearer. Dedicated bearer creation can fail. Lack of radio resources at the RAN, device side issues, handover errors, and the like can result in dedicated bearer failure. In conventional wireless networks, when dedicated bearer creation failure occurs, the originating user device is forced to terminate the requested voice session. Unfortunately, wireless communication networks do not effectively or efficiently maintain multimedia sessions like voice calls in response to dedicated bearer failure.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for Internet Protocol Multimedia Subsystem (IMS) multimedia sessions. Some embodiments comprise a method of operating a wireless communication network to maintain multimedia sessions in response to bearer failure. The method comprises, in response to a multimedia session request for a user device received over a default bearer, requesting a dedicated bearer to serve the requested multimedia session. The method further comprises receiving an error message that comprises an error code indicating the dedicated bearer could not be established. The method further comprises determining when the default bearer can support the requested multimedia session based on the error code. The method further comprises, when the default bearer can support the requested multimedia session, maintaining the default bearer for the user device and establishing the requested multimedia session over the default bearer.

Some embodiments comprise a wireless communication network to maintain multimedia sessions in response to bearer failure. The wireless communication network comprises Call Session Control Function (CSCF) circuitry. The CSCF circuitry requests a dedicated bearer to serve the multimedia session in response to a multimedia session request for a user device received over a default bearer. The CSCF circuitry receives an error message that comprises an error code indicating the dedicated bearer could not be established. The CSCF circuitry determines when the default bearer can support the requested multimedia session based on the error code. The CSCF circuitry maintains the default bearer for the user device and establishes the requested multimedia session over the default bearer when the default bearer can support the requested multimedia session.

Some embodiments comprise one or more non-transitory computer-readable storage media having program instructions stored thereon to maintain multimedia sessions in response to bearer failure. The program instructions, when executed by a computing system, direct the computing system to perform operations. The operations comprise, in response to a multimedia session request for a user device received over a default bearer, requesting a dedicated bearer to serve the requested multimedia session. The operations further comprise receiving an error message that comprises an error code indicating the dedicated bearer could not be established. The operations further comprise determining when the default bearer can support the requested multimedia session based on the error code. The operations further comprise, when the default bearer can support the requested multimedia session, maintaining the default bearer for the user device and establishing the requested multimedia session over the default bearer.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
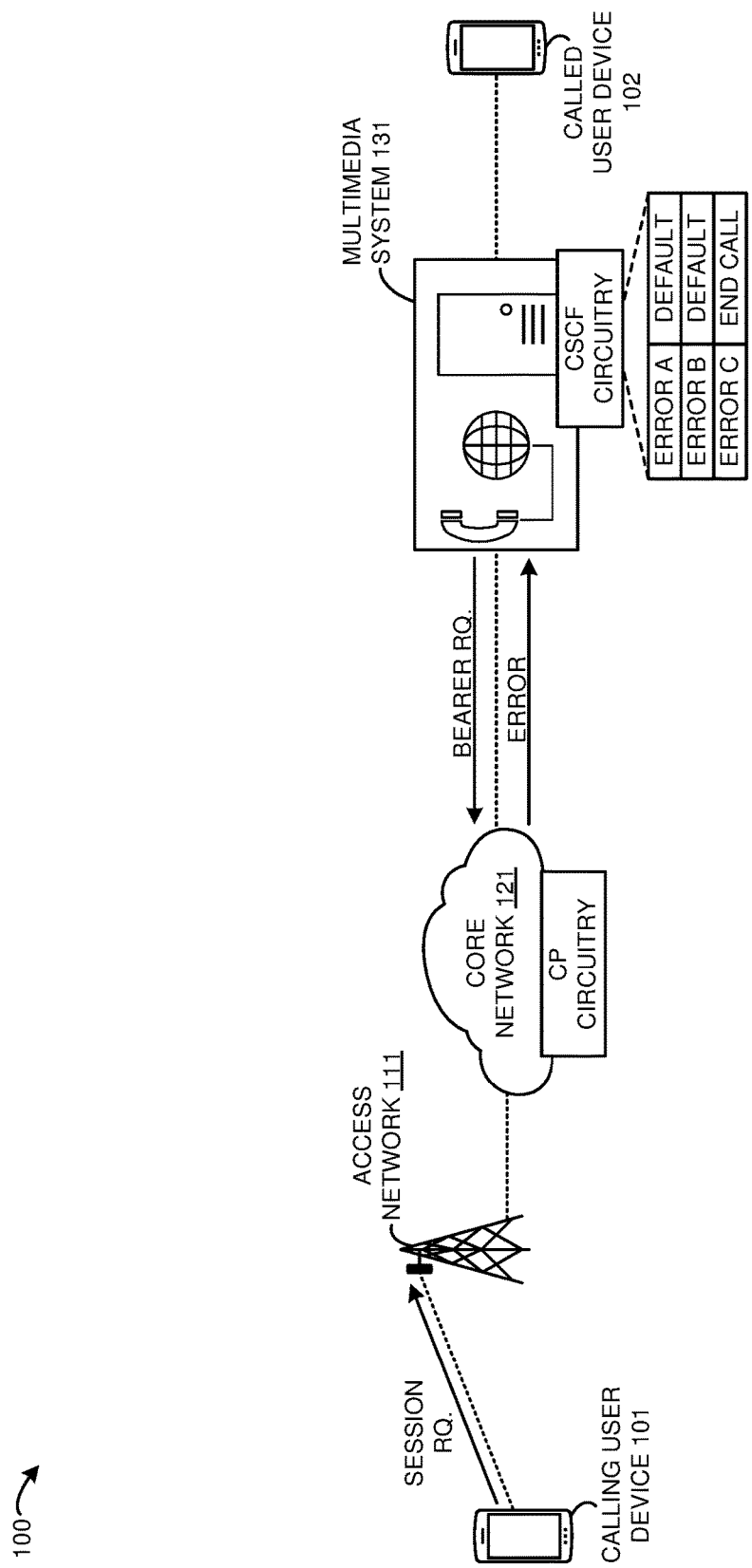
FIG. 1 illustrates a wireless communication network to maintain multimedia sessions in response to bearer failure.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

Technical Description

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication network 100 network to maintain multimedia sessions in response to bearer failure. Wireless communication network 100 delivers services like voice calling machine communications, internet-access, media-streaming, or some other wireless communications product to user devices. Wireless communication network 100 comprises calling user device 101, access network 111, core network 121, multimedia system 131, and called user device 102. Core network 121 comprises control plane (CP) circuitry. Multimedia system 131 comprises Call Session Control Function (CSCF) circuitry. In other examples, wireless network communication network 100 may comprise additional or different elements than those illustrated in FIG. 1.

Various examples of network operation and configuration are described herein. In some examples, calling user device 101 transfers a session request (SESSION RQ.) to core network 121 over its default bearer via access network 111 to initiate a multimedia session with called user device 102. Exemplary multimedia sessions include voice calls, video calls, instant message sessions, and the like. The default bearer comprises a set of radio resources to carry signaling between user device 101 and access network 111. The default bearer allows user device 101 to transfer requests to core network 121 for additional radio resources to support sessions (e.g., voice calls, data sessions, etc.). The additional radio resources form dedicated radio bearers which generally have a higher quality than the default radio bearer. For example, a dedicated bearer may be able to support a Guaranteed Bit Rate (GBR) session while the default bearer may not be able to support a GBR session.

Core network 121 delivers the session request to multimedia system 131. Multimedia system 131 delivers the session request to called user device 102 and organizes the requested session. Called user device 102 accepts the session request. Multimedia system 131 transfers a dedicated bearer request (BEARER RQ.) to core network 121 to reserve radio resources to support the multimedia session between user device 101 and called user device 102. Core network 121 encounters an error when attempting to create the dedicated bearer for user device 101 and indicates the error type to multimedia system 131. The CSCF circuitry in multimedia system 131 hosts a data structure that implements the table illustrated in FIG. 1. The table correlates different error types to default bearer ability to support the multimedia session. As illustrated in FIG. 1, the default bearer can be used to support the multimedia session when error types A and B occur but cannot be used when error type C occurs. Dedicated bearer setup failure can occur in response to a lack of radio resource, handover error, device side signaling issues, and the like. In this example, multimedia system 131 determines the multimedia session can continue over the default bearer and establishes the multimedia session over the default bearer. User device 101 exchanges user data for the multimedia session over the default bearer.

Calling user device 101 and called user device 102 are representative of wireless user devices. Exemplary user devices include phones, computers, vehicles, robots, sensors, and/or other devices with wireless communication capabilities. Access network 111 exchanges wireless signals with user device 101 over radio frequency bands. The radio frequency bands use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121. Access network 111 may comprise a wireless access point, a Radio Access Networks (RAN), internet backbone providers, edge computing systems, or other types of wireless/wireline access systems to provide wireless links to user device 101, the backhaul links, and edge computing services between user device 101 and core network 121.

Access network 111 may comprise Radio Units (RUS), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUS handle higher wireless network layers like the Radio Resource Control (RRC), Service Data Adaption Protocol (SDAP), and Packet Data Convergence Protocol (PDCP). The CUs are coupled to network functions in core network 121.

Core network 121 and multimedia system 131 are representative of computing systems that provide wireless data services to user device 101 over access network 111. Exemplary computing systems comprise data centers, server farms, cloud computing networks, hybrid cloud networks, and the like. The computing systems of core network 121 store and execute the network functions to provide wireless data services to originating UE 101 over access network 111. Exemplary network functions include Access and Mobility Management Function (AMF), Mobility Management Entity (MME), Session Management Function (SMF), User Plane Function (UPF), Packet Gateway (P-GW), Serving Gateway (S-GW), Policy Control Function (PCF), Policy Rules and Charging Function (PCRF), and Unified Data Management (UDM). Core network 121 may comprise a Fifth Generation Core (5GC) architecture and/or an Evolved Packet Core (EPC) architecture. The AMF, MME, SMF, PCRF, PCF, and UDM are control plane elements to handle signaling between the user device and network core while the UPF, P-GW, and S-GW comprise user plane elements to handle data exchange between the user device and network core. In examples where core network 121 comprises EPC architecture, the control plane circuitry may comprise functions like MME and PCRF, the user plane circuitry may comprise functions like P-GW and S-GW, and the link between the PCRF and the CSCF circuitry may comprise an Rx interface. In examples where core network 121 comprises 5GC architecture, the control plane circuitry may comprise functions like AMF, SMF, PCF, and UDM, the user plane circuitry may comprise functions like UPF, and the link between the PCF and the CSCF circuitry may comprise an N5 interface.

The computing systems of multimedia system 131 store and execute multimedia functions to provide services like voice calling, video conferencing, and text messaging to user device 101. Exemplary multimedia functions include Call Session Control Function (CSCF), Telephony Application Server (TAS), and Short Message Service Application Server (SMS AS). Multimedia system 131 may comprise an Internet Protocol Multimedia Subsystem (IMS) core architecture. For example, multimedia system 131 may receive text messages or voice call requests sent by originating UE 101 and route the text messages and voice call requests to their respective message destinations.

Figure 2:
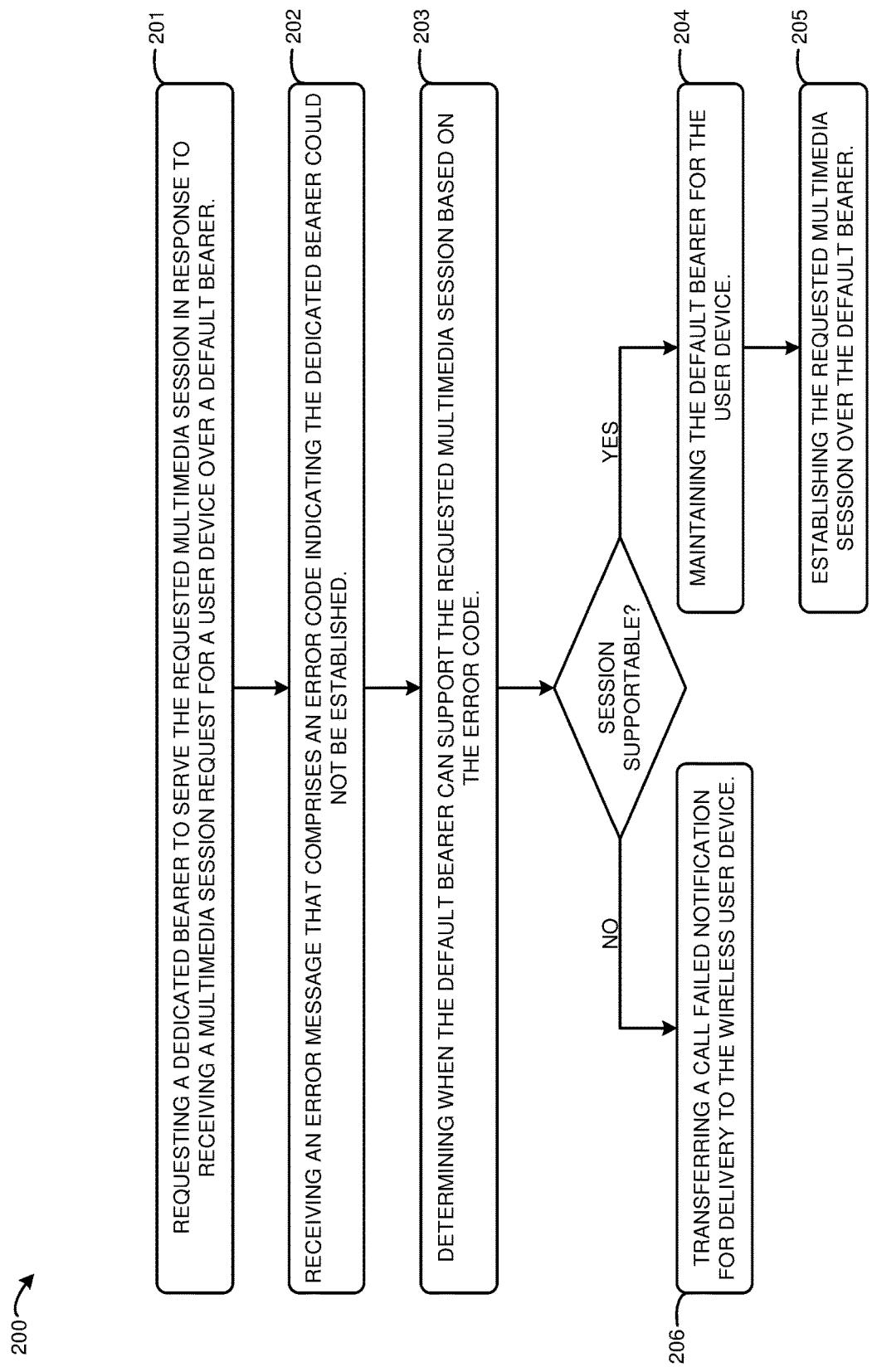
FIG. 2 illustrates an exemplary operation of the wireless communication network to maintain multimedia sessions in response to bearer failure.

FIG. 2 illustrates process 200. Process 200 comprises an exemplary operation of wireless communication network 100 to maintain multimedia sessions in response to bearer failure. The operation may vary in other examples. The operations of process 200 comprise requesting a dedicated bearer to serve the requested multimedia session in response to receiving a multimedia session request for a user device over a default bearer (step 201). The operations further comprise receiving an error message that comprises an error code indicating the dedicated bearer could not be established (step 202). The operations further comprise determining when the default bearer can support the requested multimedia session based on the error code (step 203). If the default bearer can support the multimedia session, the operations continue by maintaining the default bearer for the user device (step 204) and establishing the requested multimedia session over the default bearer (step 205). If the default bearer cannot support the multimedia session, the operations continue by transferring a call failed notification for delivery to the wireless user device (step 206).

Figure 3:
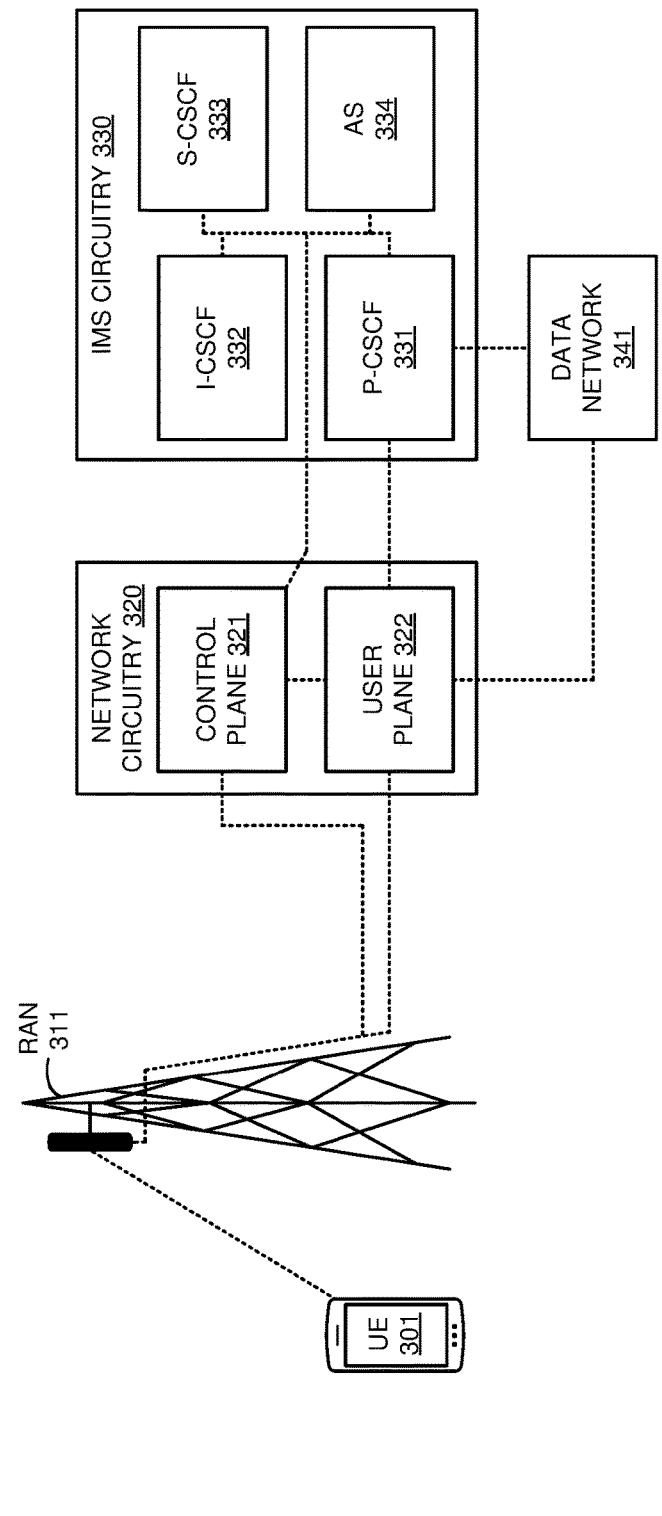
FIG. 3 illustrates a wireless communication network to maintain multimedia sessions in response to bearer failure.

FIG. 3 illustrates wireless communication network 300 network to maintain multimedia sessions in response to bearer failure. Wireless communication network 300 is an example of wireless network 100, however network 100 may differ. Wireless communication network 300 comprises User Equipment (UE) 301, RAN 311, network circuitry 320, IMS circuitry 330, and data network 341. Network circuitry 320 comprises control plane 321 and user plane 322. IMS circuitry 330 comprises Proxy-CSCF (P-CSCF) 331, Interrogating-CSCF (I-CSCF) 332, Serving-CSCF (S-CSCF) 333, and Application Server (AS) 334. In other examples, wireless network 300 may comprise additional or different elements than those illustrated in FIG. 3.

In some examples, P-CSCF 331 receives a session request transferred by UE 301 for a multimedia session over data network 341. P-CSCF 331 interfaces with I-CSCF 332 and S-CSCF 333 to establish the multimedia session. P-CSCF 331 transfers the session request to data network 341 and requests a dedicated bearer for the multimedia session from control plane 321. When network circuitry 320 comprises 5GC architecture, control plane 321 may comprise a PCF and P-CSCF 331 may request the dedicated bearer from the PCF over an N5 interface. When network circuitry 320 comprises EPC architecture, control plane 321 may comprise a PCRF and P-CSCF 331 may request the dedicated bearer from the PCRF over an Rx interface. In response to the session and dedicated bearer requests, control plane 321 directs RAN 311 to reserve radio resources for UE 301 to form the dedicated radio bearer. An error occurs in RAN 311 (e.g., lack of radio resources) or UE 301 (e.g., handover error) preventing the establishment of the dedicated bearer. RAN 311 notifies control plane 321 of the error. Control plane 321 transfers an error message to P-CSCF 331. The error message includes an error code that characterizes the error type. When network circuitry 320 comprises 5GC architecture, control plane 321 may comprise a PCF and the PCF may transfer the error message to P-CSCF 331 over an N5 interface. When network circuitry 320 comprises EPC architecture, control plane 321 may comprise a PCRF and the PCRF may transfer the error message to P-CSCF 331 over an Rx interface. P-CSCF 331 processes the error code to determine if the requested multimedia can be maintained over the default bearer. P-CSCF 331 determines the session can continue over the default bearer based on the error code. In response, P-CSCF 331 interfaces with the other IMS functions to establish the multimedia session for UE 301 over UE 301's default radio bearer.

Advantageously, wireless communication network 300 effectively maintains multimedia sessions over default radio bearers in response to dedicated bearer failure. Moreover, P-CSCF 331 efficiently correlates dedicated bearer error codes to session survivability to determine when multimedia sessions can continue over the default radio bearer.

UE 301 and RAN 311 communicate over links using wireless technologies like 5GNR, LTE, LP-WAN, WIFI, Bluetooth, and/or some other type of wireless networking protocol. The wireless technologies use electromagnetic frequencies in the low-band, mid-band, high-band, or some other portion of the electromagnetic spectrum. RAN 311, network circuitry 320, IMS circuitry 330, and data network 341 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, interprocessor communication, bus interfaces, and/or some other data communication protocols.

UE 301 may comprise a phone, vehicle, computer, sensor, drone, robot, or another type of data appliance with wireless communication circuitry. Although RAN 311 is illustrated as a tower, RAN 311 may comprise another type of mounting structure (e.g., a building), or no mounting structure at all. RAN 311 comprises a Fifth Generation (5G) RAN, LTE RAN, gNodeB, eNodeB, NB-IoT access node, LP-WAN base station, wireless relay, WIFI hotspot, Bluetooth access node, and/or another wireless or wireline network transceiver. UE 301 and RAN 311 comprise antennas, amplifiers, filters, modulation, analog/digital interfaces, microprocessors, software, memories, transceivers, bus circuitry, and the like. Control plane 321 comprises network functions like AMF, MME, SMF, PCF, PCRF, UDM, and the like. User plane 322 comprises network functions like UPF, edge UPF, P-GW, S-GW, and the like.

UE 301, RAN 311, network circuitry 320, IMS circuitry 330, and data network 341 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
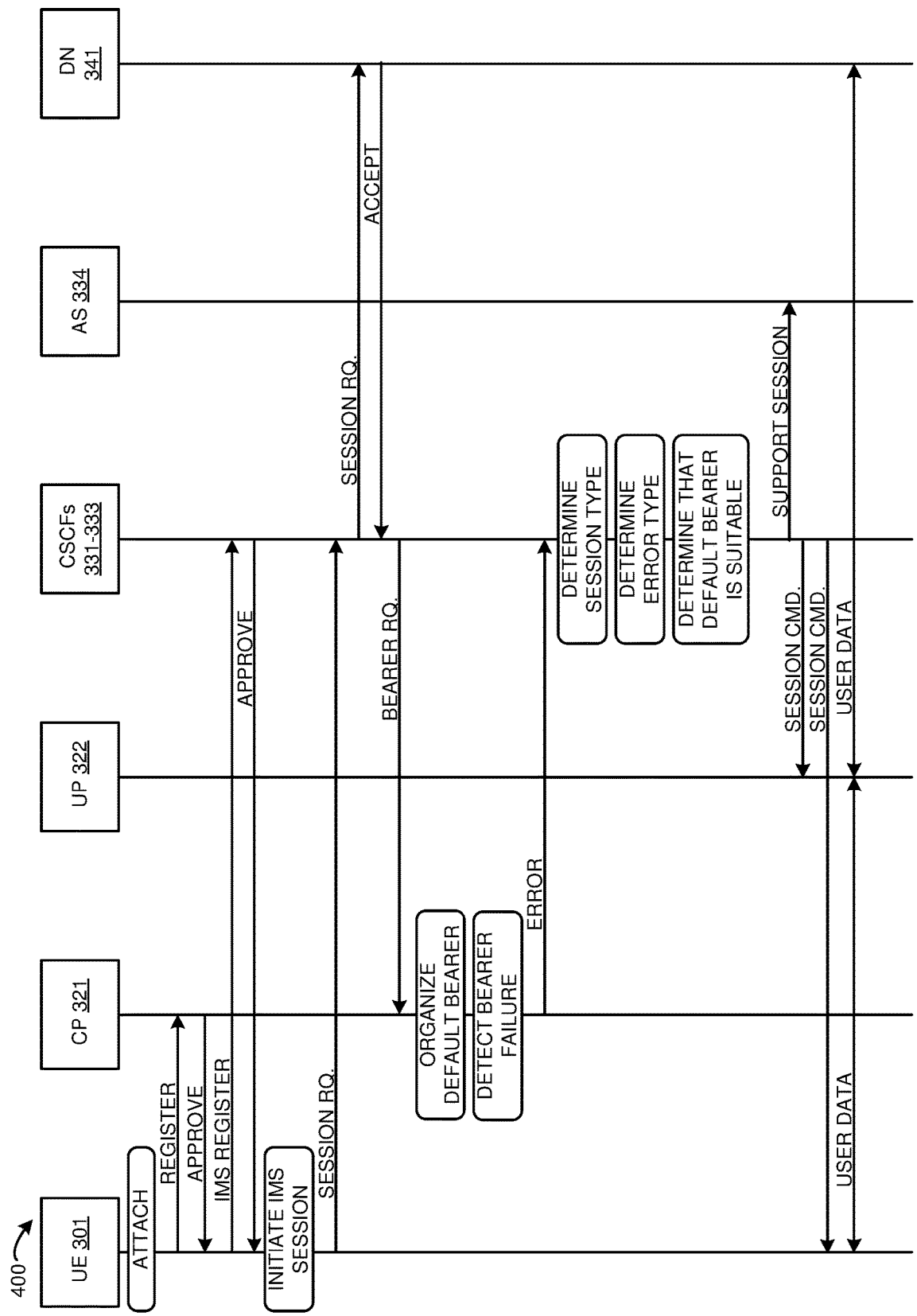
FIG. 4 illustrates an exemplary operation of the wireless communication network to maintain multimedia sessions in response to bearer failure.

FIG. 4 illustrates process 400. Process 400 comprises an exemplary operation of wireless communication network 300 to maintain multimedia sessions in response to bearer failure. In operation, UE 301 attaches to RAN 311 and establishes a default signaling bearer with RAN 311. UE 301 wirelessly transfers a registration request to control plane (CP) 321 over the default bearer and RAN 311. Control plane 321 processes the registration request to authenticate the identity of UE 301 and determine what services UE 301 is authorized for. Control plane 321 registers UE 301 and transfers a registration approval message to UE 301 over RAN 311 and the default bearer.

Once registered with network circuitry 320, UE 301 transfers an IMS registration request to P-CSCF 331 to register for IMS services like voice calling. P-CSCF 331 forwards the registration request to S-CSCF 333 which interfaces with the other IMS functions and control plane 321 to register UE 301 for IMS services. S-CSCF 333 indicates the successful registration to P-CSCF 331. P-CSCF 331 transfers a registration approval message to UE 301. Once registered for IMS services, UE 301 initiates an IMS voice session by generating an IMS session request. For example, UE 301 may generate and transfer a Mobile Originating Session Initiation Protocol (MO SIP) invite to initiate a voice call with a user in data network 341. UE 301 transfers the voice session request over the default bearer to RAN 311 which forwards the session request to P-CSCF 331 over user plane (UP) 322. P-CSCF 331 interfaces with I-CSCF 332 and S-CSCF 333 to route the session request to the intended destination. For example, S-CSCF 333 may map a publicly available Uniform Resource Indicator (URI) or phone number for the destination included in the session request to a registered Internet Protocol (IP) address for the destination and transfer the session request based on the registered IP address. In this example, S-CSCF 333 determines the destination is in data network 341 and drives P-CSCF 331 to transfer the session request to data network 341. P-CSCF 331 receives a session accept message from data network 341 and indicates the acceptance to S-CSCF 333.

S-CSCF 333 directs P-CSCF 331 to reserve radio resources to form the dedicated bearer to support the multimedia session. P-CSCF 331 transfers a bearer request (BEARER RQ.) to control plane 321. The request may indicate attributes like session type, required Quality of Service Class Indicator (QCI), and the like that govern the amount of radio resources needed to support the multimedia session to form the dedicated radio bearer. Control plane 331 directs RAN 311 to allocate radio resources for dedicated bearer to support UE 301's multimedia session. RAN 311 notifies control plane 321 that the required amount of radio resources to form the dedicated bearer is not available. Control plane 321 detects an error based on the notification and transfers an error notification to P-CSCF 331. The error notification includes an error code signifying a lack of radio resources. P-CSCF 331 determines the session type comprises an IMS voice session and the error type is a lack of radio resources error. P-CSCF 331 hosts a data structure that governs default bearer support for IMS sessions based on session type and error type. P-CSCF 331 inputs the session type and error type into the data structure which outputs an indication that the default bearer is suitable. In response to the indication, P-CSCF 331 determines to continue the multimedia session and establish the session over the default bearer.

P-CSCF 331 directs S-CSCF 333 to establish the multimedia session. S-CSCF 333 interfaces with AS 334 to support the voice session and transfers session commands (SESSION CMD.) to user plane 322 and UE 301. The session command comprises information like routing data to instruct user plane 322 and UE 301 where to transfer the session data. In response to the session command, UE 301 exchanges user data for the voice session over the default bearer and RAN 311 with user plane 322. User plane 322 exchanges the user data with data network 341. S-CSCF 333 and AS 334 monitor the session to control the flow of user data.

Figure 5:
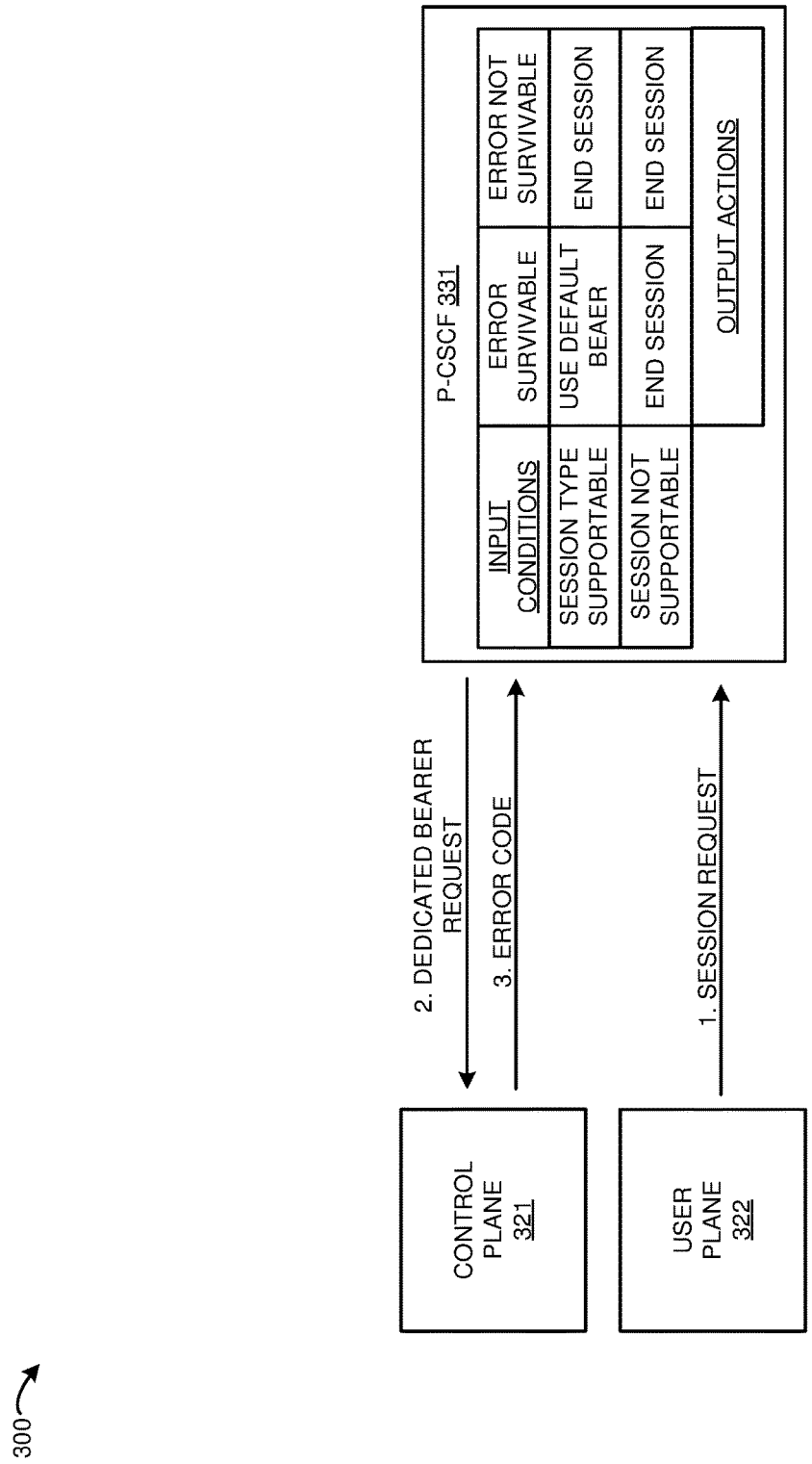
FIG. 5 illustrates a control plane, user plane, and Proxy-Call Session Control Function (P-CSCF) in the wireless communication network.

FIG. 5 further illustrates control plane 321, user plane 322, and P-CSCF 331 in wireless communication network 300. P-CSCF 331 hosts a data structure that implements the table illustrated in FIG. 5. As illustrated in FIG. 5, the table comprises input conditions and output actions. The input conditions comprise error survivable, error not survivable, session type supportable, and session type not supportable. The error survivable conditions govern whether the error preventing the creation of the dedicated bearer prevents the session from continuing on the default bearer. For example, an error that detached UE 301 from the network may be classified as non-survivable while an error caused by lack of radio resources in RAN 311 may be classified as survivable. In should be appreciated that error types that inhibit communications with UE 301 are generally not survivable while error types that do not inhibit communications with UE 301 are generally survivable. The session supportable conditions govern whether the requested session type can be supported over the default bearer. For example, a non-GBR voice session or instant messaging session may be supported using the default data bearer while a GBR voice call or video call may not be able to be supported using the default data bearer. In should be appreciated that multimedia sessions that require excessive radio resources are generally not supportable over the default bearer while multimedia sessions that require less radio resources can be supported over the default bearer.

The output actions comprise use default bearer and end session. The output actions are based on the input conditions provided to the data structure and indicate whether the multimedia session can be continued on the default bearer when dedicated bearer creation fails. If the error type is survivable and the multimedia session type can be supported on the default bearer, the output actions direct P-CSCF 331 to use the default bearer to establish the multimedia session. If the error type is not survivable and/or the multimedia session type cannot be supported on the default bearer, the output actions and direct P-CSCF 331 to end the multimedia session.

In some examples, user plane 322 transfers a session request generated by UE 301 to P-CSCF 331. P-CSCF 331 identifies the session type based on the request and caches the session type in memory. P-CSCF 331 forwards the request to S-CSCF 333. Subsequently, P-CSCF 331 receives a command from S-CSCF 333 to set up the dedicated bearer to support the multimedia session and responsively transfers a dedicated bearer request to control plane 321. Control plane 321 responds to the dedicated bearer request with an error code indicating dedicated bearer setup failure. P-CSCF 331 receives the error code and retrieves the session type from memory. P-CSCF 331 inputs the error code and session type into the data structure. P-CSCF 331 either maintains the multimedia session using the default bearer of UE 301 or ends the multimedia session based on the output from the data structure. It should be appreciated that the table illustrated in FIG. 5 is exemplary and that the data structure hosted by P-CSCF 331 may differ in other examples. For example, the data structure may comprise additional input conditions like Radio Access Technology (RAT) type or network slice ID to determine when to continue the multimedia session on the default bearer.

Figure 6:
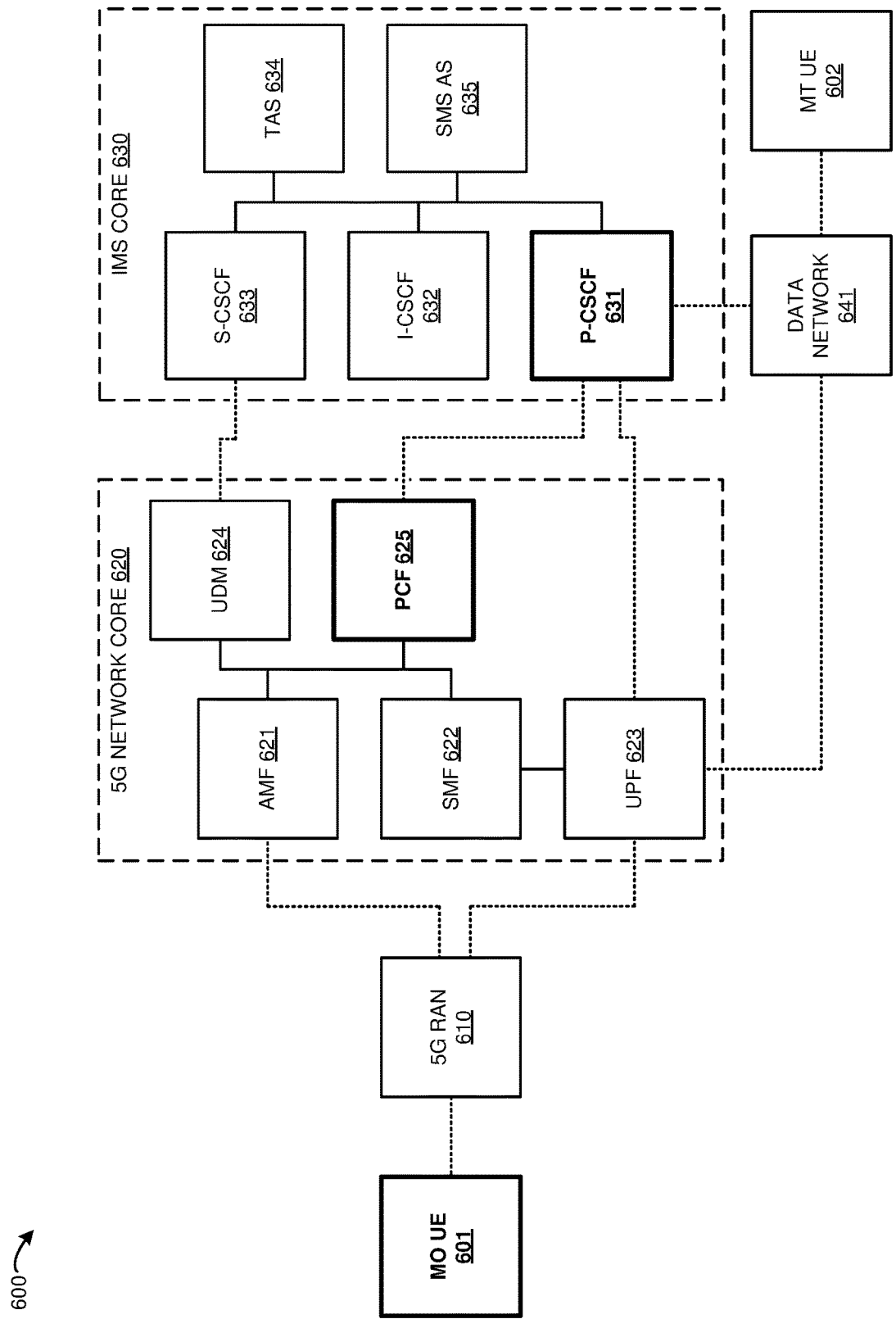
FIG. 6 illustrates a Fifth Generation (5G) wireless communication network to maintain multimedia sessions in response to bearer failure.

FIG. 6 illustrates 5G communication network 600 to maintain multimedia sessions in response to bearer failure. Communication network 600 comprise Mobile Originating User Equipment (MO UE) 601, Mobile Terminating User Equipment (MT UE) 602, RAN 610, 5G network core 620, IMS core 630, and data network 641. 5G network core 620 comprises Access and Mobility Management Function (AMF) 621, Session Management Function (SMF) 622, User Plane Function (UPF) 623, Unified Data Management (UDM) 624, and Policy Control Function (PCF) 625. IMS core 630 comprises Proxy Call Session Control Function (P-CSCF) 631, Interrogating Call Session Control Function (I-CSCF) 632, Serving Call Session Control Function (S-CSCF) 633, Telephony Application Server (TAS) 634, and Short Message Service Application Server (SMS AS) 635. Other network functions and network elements like Authentication Server Function (AUSF), Network Slice Selection Function (NSSF), Short Message Service Function (SMSF), Unified Data Registry (UDR), Network Exposure Function (NEF), Network Repository Function (NRF), and Application Function (AF) are typically present in 5G network core 620 but are omitted for clarity. Other IMS functions and IMS elements like Breakout Gateway Control Function (BGCF), Multimedia Resource Function (MRF), Media Gateway Control Function (MGCF), E.164 Number Mapping (ENUM), Home Subscriber Server (HSS), and Interconnecting Border Control Function (IBCF) are typically present in IMS ore 630 but are omitted for clarity. In other examples, wireless network communication network 600 may comprise additional or different elements than those illustrated in FIG. 6.

In some examples, UE 601 wirelessly attaches to RAN 610. UE 601 exchanges attachment signaling with RAN 610 to establish a default signaling radio bearer with 5G network applications hosted by RAN 610. UE 601 uses the default signaling bearer to secure additional radio resources to receive wireless voice and data services from network core 620. UE 601 transfers a registration request over the default signaling bearer to RAN 610. The registration request includes information like a registration type, UE capabilities, requested slice types, Protocol Data Unit (PDU) session requests, and the like. RAN 610 forwards the registration request for UE 601 to AMF 621. In response to the registration request, AMF 621 transfers an identity request to UE 601 over RAN 610. UE 601 indicates its identity to RAN 610 over the default signaling radio bearer. RAN 610 forwards the identity indication to AMF 621. AMF 621 interacts with other network functions to authenticate the identity of UE 601 and authorize UE 601 for wireless data service. For example, AMF 621 may interface with an AUSF and retrieve authentication vectors from UDM 624 to authenticate the identity of UE 601.

Responsive to the authentication and authorization, AMF 621 selects UDM 624 to generate UE context for UE 601. AMF 621 retrieves Quality-of-Service (QOS) metrics, allowed slice identifiers, service attributes, and the like from UDM 624. AMF 621 generates UE context comprising the information retrieved from UDM 624. AMF 621 selects PCF 625 to create a network policy association for UE 601. PCF 625 transfers network policy information for UE 601 to AMF 621 and registers for event reporting from AFM 621 like registration state change events. AMF 621 interfaces with other network functions to select a network slice for UE 601. For example, AMF 621 may interface with an NSSF to select a slice ID for UE 601 based on the service attributes retrieved from UDM 624 and/or slice selection criteria received from UE 601. AMF 621 selects SMF 622 to serve UE 601 based on the slice ID, QOS metrics, requested PDU sessions, service attributes, and/or other data retrieved UDM 624 or received in the registration request from UE 601. SMF 622 selects P-CSCF 631 and UPF 623 based on the service information provided by the one of UDM 624. SMF 622 indicates the network addresses for UPF 623 and P-CSCF 631 to AMF 621. AMF 621 includes the network addresses in the UE context AMF 621 transfers the UE context for UE 601 to RAN 610. RAN 610 wirelessly transfers the UE context to UE 601 over the default radio signaling bearer. UE 601 uses the UE context to establish a default radio data bearer with RAN 610 and exchanges user data for UE 601's active PDU sessions with RAN 610 over the default radio data bearer. RAN 610 exchanges the user data with UPF 623.

UE 601 generates an IMS registration request to register for IMS services like voice calling from IMS 630. UE 601 addresses the registration request for P-CSCF 631 and transfers the IMS registration request to RAN 610. RAN 610 forwards the IMS registration request to UPF 623. UPF 623 reads the network address for P-CSCF 631 in the IMS registration request and forwards the request to P-CSCF 631. P-CSCF 631 performs a DNS query to determine the network address for I-CSCF 632 and forwards the registration request to I-CSCF 632. I-CSCF 632 interfaces with UDM 624 to identify and select S-CSCF 633. I-CSCF 632 forwards the IMS registration request to S-CSCF 633. S-CSCF 633 exchanges authentication signaling with UE 601 and UDM 624 to authenticate and authorize UE 601 for IMS services. For example, UDM 624 may access the subscriber profile for UE 601 to determine if UE 601 qualifies for IMS service and may indicate the qualification to S-CSCF 633. Upon authentication and authorization, S-CSCF 633 registers UE 601 for IMS service and notifies P-CSCF 631. P-CSCF 631 transfers a registration accept message to UE 601 over UPF 623 and RAN 610.

Once registered with IMS core 630, UE 601 initiates a MO IMS voice session with MT UE 602. MO UE 601 generates a MO SIP invite message that includes the public URI for MT UE 602. For example, the public URI may comprise the phone number for MT UE 602. UE 601 transfers the SIP invite to RAN 610 over the default radio data bearer. RAN 610 forwards the SIP invite to UPF 623 which delivers the SIP invite message to P-CSCF 631. P-CSCF 631 receives the SIP invite and caches the requested multimedia session type, in this example, a voice session, in memory. P-CSCF 631 transfers the SIP invite to S-CSCF 633. S-CSCF 633 receives the SIP invite and notifies TAS 634 of the requested voice session. S-CSCF 633 translates the URI for MT UE 602 included into the IP address for MT UE 602 registered with IMS 630. S-CSCF 633 replaces the URI for MT UE 602 with the IP address in the SIP invite. S-CSCF 633 identifies that the IP address for MT UE 602 was registered with P-CSCF 631. S-CSCF 633 returns the SIP invite to P-CSCF 631 based on the registration for MT UE 602 and directs P-CSCF 631 to deliver the SIP invite to MT UE 602. P-CSCF 631 transfers the SIP invite for delivery to MT UE 602 over data network 641.

MT UE 602 accepts the MO SIP invite to participate in a voice call with MO UE 601. MT UE 602 indicates the acceptance to P-CSCF 631 which notifies S-CSCF 633. S-CSCF 633 indicates the acceptance to MO UE 601 over P-CSCF 631, UPF 623, and RAN 610. S-CSCF 633 directs TAS 634 to support the voice session and directs P-CSCF 631 to secure the wireless resources to carry the data for the voice session. P-CSCF 631 transfers a dedicated bearer request to secure the radio resources for the voice session over an N5 interface to PCF 625. PCF 625 receives the request and directs AMF 621 to create a dedicated bearer for the voice call. AMF 621 interfaces with RAN 610 to attempt create the dedicated data radio bearer for the voice call. In this example, an error occurs preventing the creation of the dedicated data radio bearer resulting in dedicated bearer failure. AMF 621 indicates the bearer failure to PCF 625. PCF 625 generates a bearer failure message that includes an error code that characterizes the error type and transfers the bearer failure message to P-CSCF 631 over their N5 interface.

In response to the bearer failure message, P-CSCF 631 retrieves the session type for the multimedia session requested by MO UE 601 from memory. In this example, the session type comprises a voice call, but the session type may differ in other examples. P-CSCF 631 reads the error code included in the bearer failure message to determine the error type. Exemplary error types include device side error, handover error, lack of radio resources, and the like. In this example, the error type indicates a lack of radio resources although the error type may differ in other examples. P-CSCF 631 hosts a decision matrix that dictates when multimedia sessions can continue after dedicated bearer failure and inputs the error code and session type into the data structure. The decision matrix outputs an indication that the multimedia session may continue over the default bearer based on the session type and the error type. In response, P-CSCF 631 decides to not end the multimedia session and informs S-CSCF 633 that bearer setup is complete.

S-CSCF 633 interfaces with data network 641 and UPF 623 over P-CSCF 631 to establish and end-to-end Realtime Transport Protocol (RTP) connection between MO UE 601 and MT UE 602 to carry the voice data for the session. P-CSCF 631 directs UPF 623 to route uplink and downlink voice data of the session over the default radio data bearer to UE 601 based on the output from the decision matrix and in response to the dedicated bearer failure. S-CSCF 633 transfers an indication for MO UE 601 that the voice session may begin to P-CSCF 631. P-CSCF 631 delivers the indication to MO UE 601 over UPF 623 and RAN 610. S-CSCF 633 transfers another indication for MT UE 602 that the voice session may begin to P-CSCF 631. P-CSCF 631 delivers the indication to MT UE 602 over data network 641. In response to the indication, MT UE 602 rings its user to notify them of the requested voice call. When the user of MT UE 602 answers the call, MT UE 602 transfers an answer indication to P-CSCF 631 which forwards the answer indication to MO UE 601 over UPF 623 and RAN 610. MO UE 601 acknowledges the answer indication to MT UE 602 to signify that the voice call may enter conversation mode.

MT UE 602 generates and transfers user data for the voice session to data network 641. Data network 641 transfers user data to UPF 623. UPF 623 transfers the user data over the default radio bearer IP tunnel to RAN 610. RAN 610 wirelessly delivers the downlink user data over the default data radio bearer to MO UE 601. MO UE 601 detects the downlink user data for the voice call is being received over the default radio data bearer. MO UE 601 generates additional user data and transfers the additional user data as uplink over the default data radio bearer to RAN 610 based on the downlink user data being received over the default data radio bearer. RAN 610 transfers the additional user data to UPF 623. UPF 623 routes the additional user data to data network 641 which delivers the user data to MT UE 602.

In some examples, network core 520 additionally comprises EPC architecture (e.g., to support both 5G and LTE functionality). In such examples, P-CSCF 631 may instead transfer the dedicated bearer request to a PCRF over an Rx interface. In response to detecting dedicated bearer setup failure, the PCRF generates a bearer failure message that includes an error code that characterizes the error type and transfers the bearer failure message to P-CSCF 631 over the Rx interface. P-CSCF 631 receives the bearer failure message from the PCRF over the Rx interface and determines if the requested multimedia session can be supported on the default bearer as described above.

Figure 7:
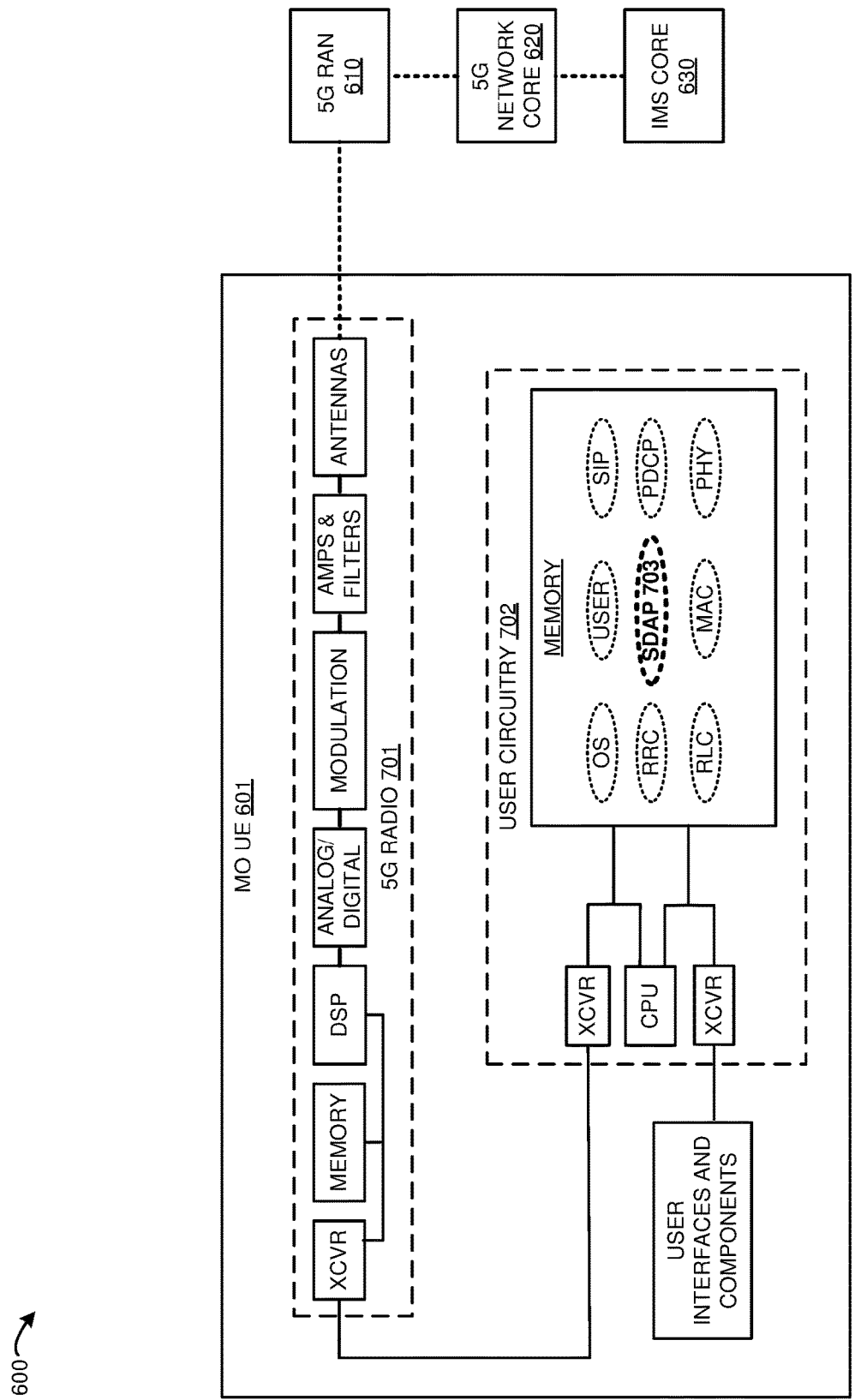
FIG. 7 illustrates a Mobile Originating User Equipment (MO UE) in the 5G communication network.

FIG. 7 illustrates MO UE 601 in 5G communication network 600. UE 601 comprises an example of calling user device 101 illustrated in FIG. 1 and UE 301 illustrated in FIG. 3, however calling user device 101 and UE 301 may differ. MT UE 602 comprises a similar structure to MO UE 601.

UE 601 comprises 5G radio 701 and user circuitry 702. Radio 701 comprises antennas, amplifiers, filters, modulation, analog-to-digital interfaces, Digital Signal Processors (DSP), memory, and transceivers (XCVRs) that are coupled over bus circuitry. User circuitry 702 comprises memory, CPU, user interfaces and components, and transceivers that are coupled over bus circuitry. The memory in user circuitry 702 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP) 703, Radio Resource Control (RRC), and Session Initiation Protocol (SIP). The antenna in radio 701 is wirelessly coupled to 5G RAN 610 over a 5GNR link. A transceiver in radio 701 is coupled to a transceiver in user circuitry 702. A transceiver in user circuitry 702 is typically coupled to the user interfaces and components like displays, controllers, and memory.

In radio 701, the antennas receive wireless signals from 5G RAN 610 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 702 over the transceivers. In user circuitry 702, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 610 that transport the uplink 5GNR signaling and data.

RRC functions comprise authentication, security, handover control, status reporting, QoS, network broadcasts and pages, and network selection. SDAP 703 functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). SIP functions comprise generating SIP invite messages and processing received SIP messages for SMS, voice calling, and video calling.

In some examples, when MO UE 601 initiates a voice call or other type of IMS multimedia session and network core 620 is unable to create the dedicated data radio bearer to support the voice call, P-CSCF 631 may decide to continue the multimedia session over the default data radio bearer between UE 601 and RAN 601. SDAP 703 monitors for downlink data received over the default radio bearer. When SDAP 703 detects the downlink data for the multimedia session is being received over the default data radio bearer, SDAP 703 correlates the detection to dedicated bearer failure. In response, SDAP 703 controls the lower layer network applications like PDCP, RLC, MAC, and PHY to transfer uplink data for the voice session to 5G RAN 610 over the default data radio bearer.

Figure 8:
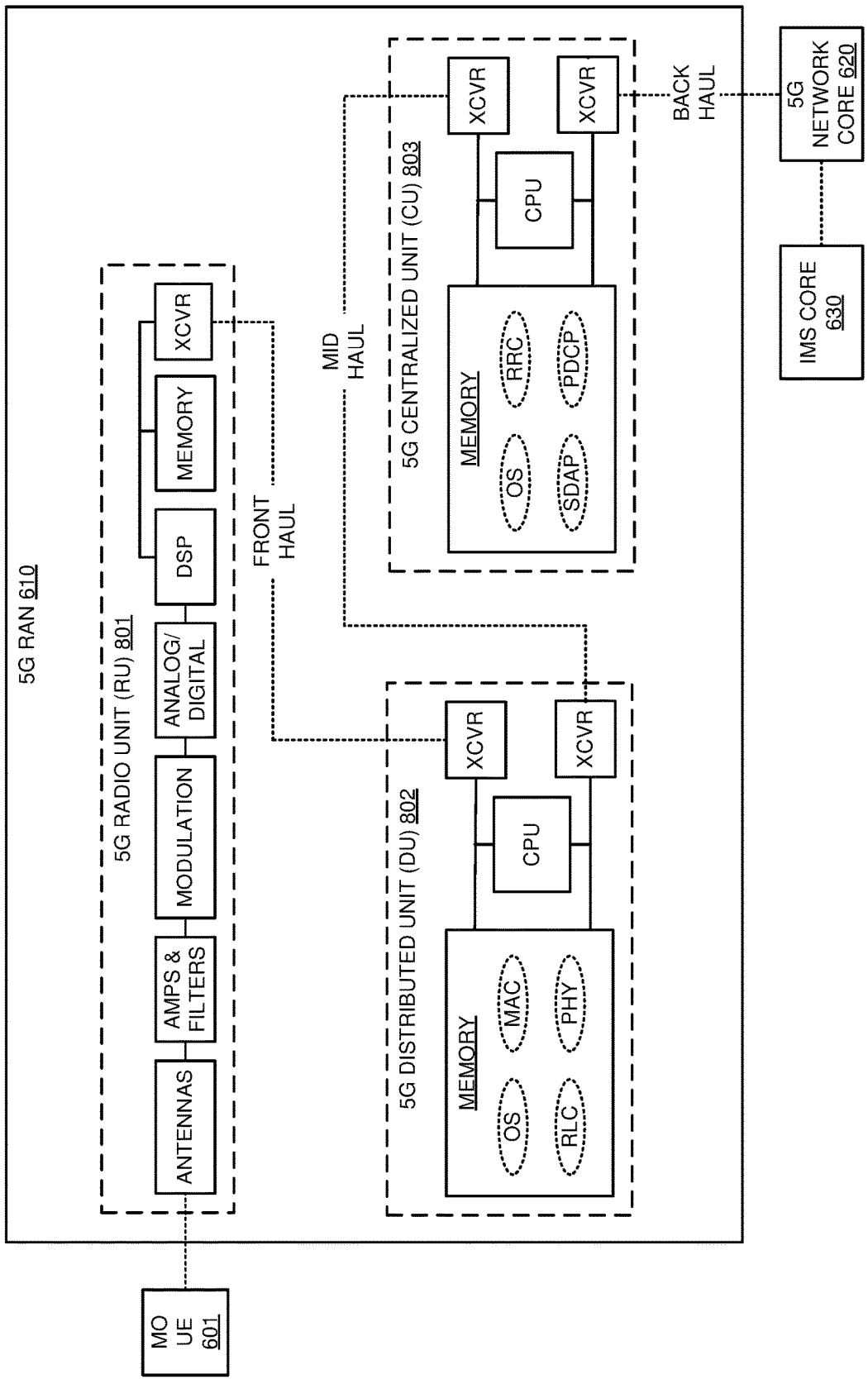
FIG. 8 illustrates a 5G Radio Access Network (RAN) in the 5G wireless communication network.

FIG. 8 further illustrates 5G RAN 610 in 5G communication network 600. 5G RAN 610 comprises 5G Radio Unit (RU) 801, 5G Distributed Unit (DU) 802, and 5G Centralized Unit (CU) 803. RAN 610 comprises an example of access network 111 illustrated in FIG. 1 and RAN 311 illustrated in FIG. 3, however access network 111 and RAN 311 may differ.

RU 801 comprises antennas, amplifiers, filters, modulation, analog-to-digital interfaces, DSP, memory, and transceivers (XCVRs) that are coupled over bus circuitry. UE 601 is wirelessly coupled to the antennas in RU 801 over 5GNR links. Transceivers in 5G RU 801 are coupled to transceivers in 5G DU 802 over fronthaul links like enhanced Common Public Radio Interface (eCPRI). The DSPs in RU 801 executes their operating systems and radio applications to exchange 5GNR signals with UE 601 and to exchange 5GNR data with DU 802.

For the uplink, the antennas receive wireless signals from UE 601 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 802 over the transceivers.

For the downlink, the DSPs receive downlink 5GNR symbols from DU 802. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink 5GNR signaling and data.

DU 802 comprises memory, CPU, and transceivers that are coupled over bus circuitry. The memory in 5G DU 802 stores operating systems and 5GNR network applications like PHY, MAC, and RLC. CU 803 comprises memory, CPU, and transceivers that are coupled over bus circuitry. The memory in CU 803 stores an operating system and 5GNR network applications like PDCP, SDAP, and RRC.

Transceivers in 5G DU 802 are coupled to transceivers in RU 801 over front-haul links. Transceivers in DU 802 are coupled to transceivers in CU 803 over mid-haul links. A transceiver in CU 803 is coupled to network core 620 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 9:
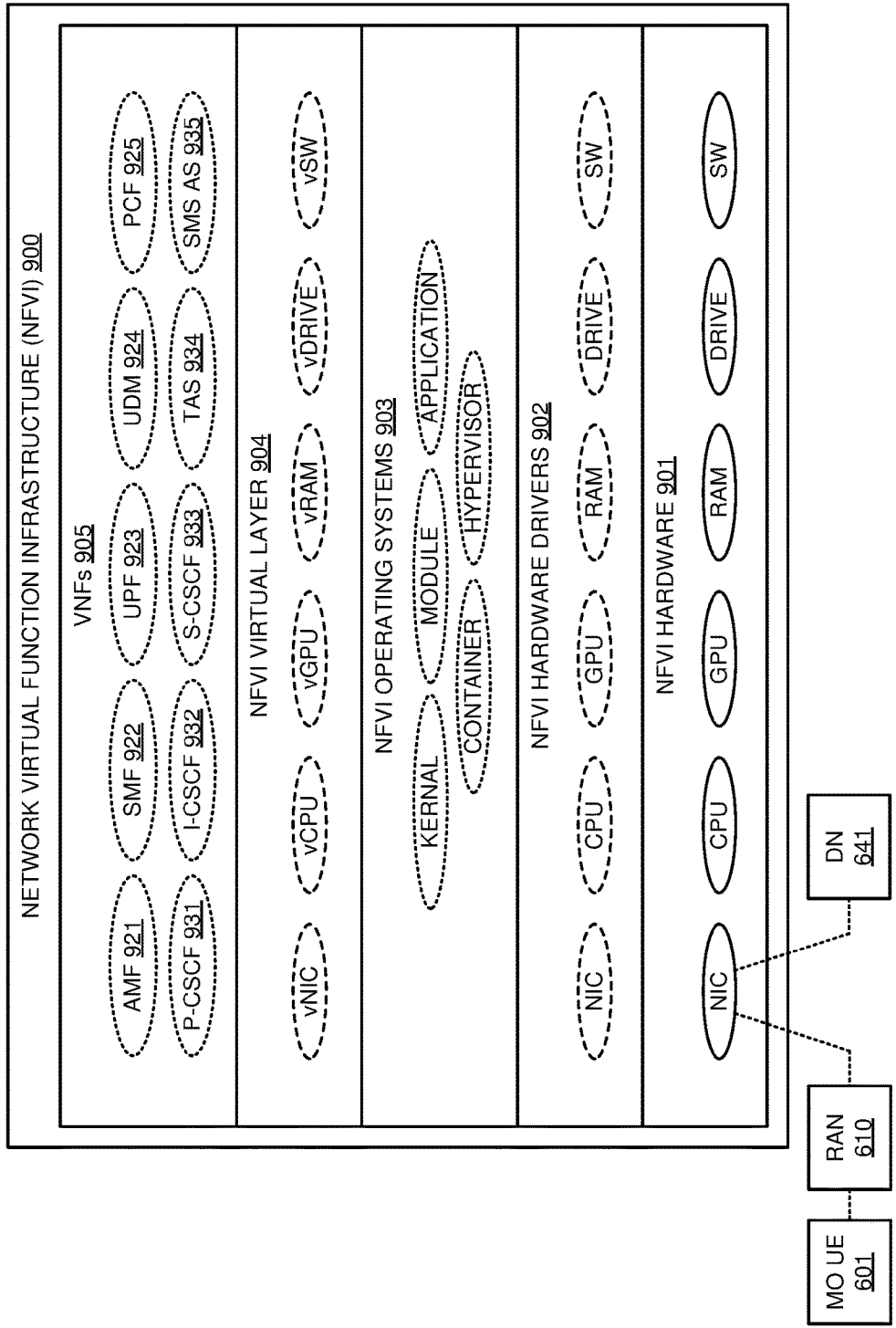
FIG. 9 illustrates a Network Function Virtualization Infrastructure (NFVI) in the 5G wireless communication network.

FIG. 9 illustrates Network Function Virtualization Infrastructure (NFVI) 900. NFVI 900 comprises an example of core network 121 and multimedia system 131 illustrated in FIG. 1 and network circuitry 320 and IMS circuitry 330 illustrated in FIG. 3, although core network 121, multimedia system 131, network circuitry 320, and IMS circuitry 330 may differ. NFVI 900 comprises NFVI hardware 901, NFVI hardware drivers 902, NFVI operating systems 903, NFVI virtual layer 904, and NFVI Virtual Network Functions (VNFs) 905. NFVI hardware 901 comprises Network Interface Cards (NICs), CPU, GPU, RAM, Flash/Disk Drives (DRIVE), and Data Switches (SW). NFVI hardware drivers 902 comprise software that is resident in the NIC, CPU, GPU, RAM, DRIVE, and SW. NFVI operating systems 903 comprise kernels, modules, applications, containers, hypervisors, and the like. NFVI virtual layer 904 comprises vNIC, vCPU, GPU, vRAM, vDRIVE, and vSW. NFVI VNFs 905 comprise AMF 921, SMF 922, UPF 923, UDM 924, PCF 925, P-CSCF 931, I-CSCF 932, S-CSCF 933, TAS 934, and SMS AS 635. Additional VNFs and network elements like AUSF, NSSF, NEF, NRF, AF, UDR, BGCF, MRF, MGCF, ENUM, HSS, and IBCF are typically present but are omitted for clarity. NFVI 900 may be located at a single site or be distributed across multiple geographic locations. For example, a first portion of NFVI 900 may be located at a first geographic location dedicated to the network functions in 5G network core 620 while a second portion of NFVI 900 may be located at a second geographic location dedicated to the IMS functions in IMS core 630. The NIC in NFVI hardware 901 is coupled to RAN 610 and to data network 641. NFVI hardware 901 executes NFVI hardware drivers 902, NFVI operating systems 903, NFVI virtual layer 904, and NFVI VNFs 905 to form AMF 621, SMF 622, UPF 623, UDM 624, PCF 625, P-CSCF 631, I-CSCF 632, S-CSCF 633, TAS 634, SMS AS 635.

Figure 10:
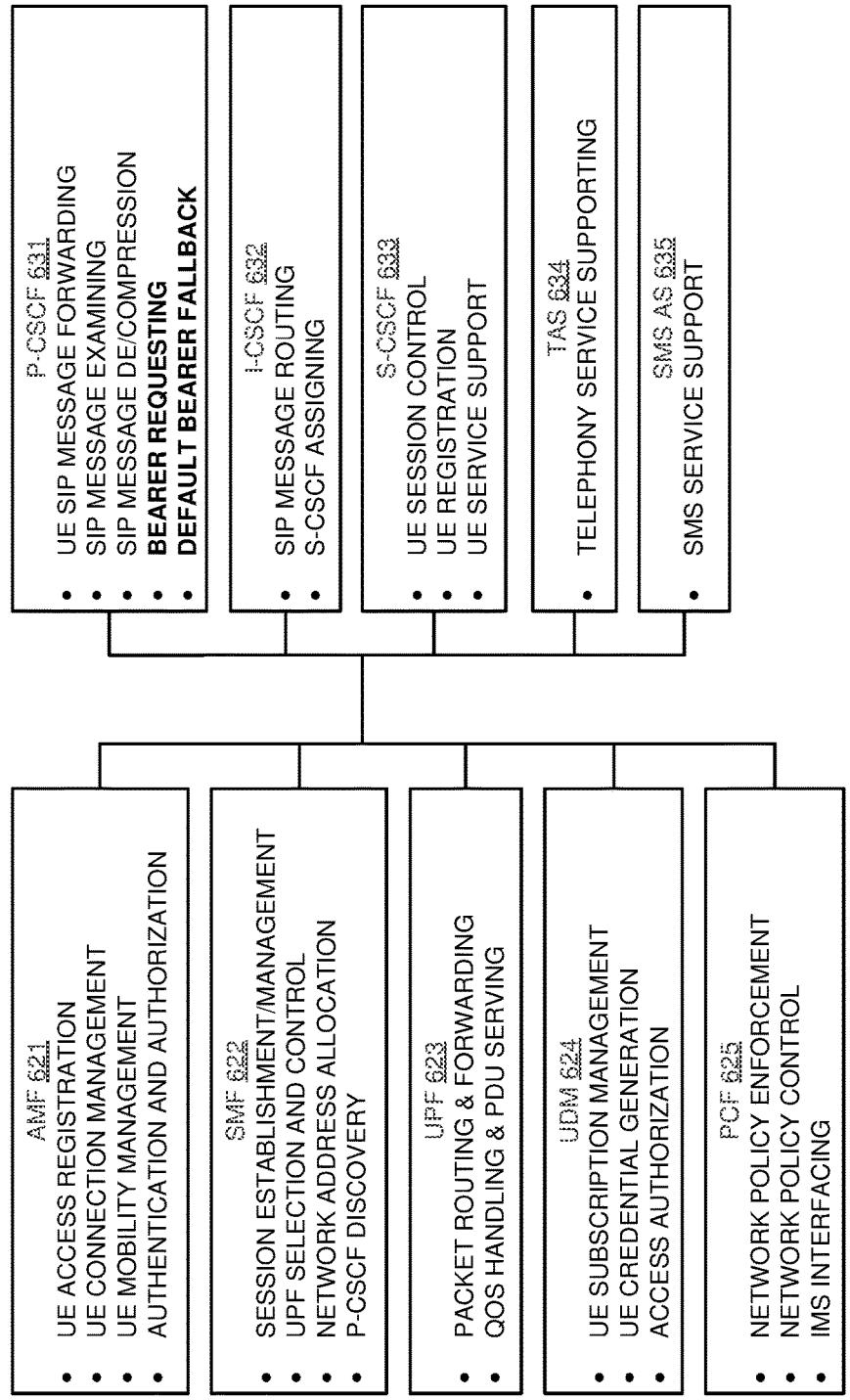
FIG. 10 further illustrates the NFVI in the 5G wireless communication network.

FIG. 10 further illustrates NFVI 900 in 5G communication network 600. AMF 621 comprises capabilities for UE access registration, UE connection management, UE mobility management, UE authentication, and UE authorization. SMF 622 comprises capabilities for session establishment, session management, UPF selection/control, and network address allocation, and P-CSCF discovery. UPF 623 comprises capabilities for packet routing, packet forwarding, QoS handling, and PDU serving. UDM 624 comprises capabilities for UE subscription management, UE credential generation, and access authorization. PCF 625 comprises capabilities for network policy enforcement, network policy control, and IMS interfacing. P-CSCF 631 comprises capabilities for UE SIP message forwarding, SIP message examining, SIP message compression, SIP message decompression, bearer requesting, and default bearer fallback. I-CSCF 632 comprises capabilities for SIP message routing and S-CSCF assigning. S-CSCF 633 comprises capabilities for UE session control, UE registration, and UE service support. TAS 634 comprises capabilities for telephony service support. SMS AS 635 comprises capabilities for SMS service support.

In some examples, AMF 621 receives a registration request generated by UE 601 from RAN 610. In response to the registration request, AMF 621 transfers an identity request to UE 601 over RAN 610. Subsequently, AMF 621 receives an identify indication generated by UE 610 over RAN 610. AMF 621 interacts with other network functions to authenticate the identity of UE 601 and authorize UE 601 for wireless data service. Responsive to the authentication and authorization, AMF 621 registers UE 601 and selects UDM 624 and retrieves data like QoS metrics, allowed slice identifiers, service attributes, and the like from UDM 624 to generate UE context. AMF 621 registers with PCF 625 to create a network policy association for UE 601. AMF 621 selects SMF 622 to serve UE 601. SMF 622 interfaces with P-CSCF 631 and UPF 623 to secure the core network resources to serve UE 601 multimedia and data sessions. AMF 621 transfers the UE context for UE 601 to RAN 610 which wirelessly delivers the UE context to UE 601 over the default radio signaling bearer.

UPF 623 receives an IMS registration request generated by UE 601 over RAN 610. and forwards the request to P-CSCF 631. P-CSCF 631 retrieves the network address for I-CSCF 632 to forward the registration request to I-CSCF 632. I-CSCF 632 interfaces with UDM 624 to identify available S-CSCFs, including S-CSCF 633. I-CSCF 632 selects S-CSCF 633 to register UE 601 transfers the IMS registration request to S-CSCF 633. I-CSCF 632 forwards the IMS registration request to S-CSCF 633. S-CSCF 633 retrieves authentication data from UDM 624 and interfaces with UE 601 to authenticate the identity of UE 601 and authorize UE 601 for IMS services. Upon authentication and authorization, S-CSCF 633 registers UE 601 for IMS service and notifies P-CSCF 631. P-CSCF 631 transfers a registration accept message to UE 601 over UPF 623 and RAN 610.

UPF 623 receives an MO IMS video session request generated by MO UE 601 for MT UE 602. UPF 623 associates the session request with P-CSCF 631 and delivers the session request to P-CSCF 631. P-CSCF 631 receives the SIP invite and determines the requested multimedia session type is a video call. P-CSCF 631 transfers the SIP invite to S-CSCF 633. S-CSCF 633 translates URI for MT UE 602 included into the IP address for MT UE 602 registered with IMS 630 and replaces the URI for MT UE 602 with the IP address in the SIP invite. S-CSCF 633 returns the SIP invite to P-CSCF 631 based on the registered IP address for MT UE 602 and directs P-CSCF 631 to deliver the SIP invite to MT UE 602. P-CSCF 631 transfers the SIP invite for delivery to MT UE 602 over data network 641.

P-CSCF 631 receives a message from MT UE 602 via data network 641 indicating acceptance to for the video session. P-CSCF 631 indicates the acceptance to S-CSCF 633 and transfers the acceptance message for delivery to MO UE 601. S-CSCF 633 directs P-CSCF 631 to create a dedicated bearer for the video session. P-CSCF 631 transfers a dedicated bearer request to PCF 625. PCF 625 receives the request and directs AMF 621 to create a dedicated bearer for the voice call. AMF 621 attempts to message UE 601 over RAN 610 to organize the dedicated radio bearer but is no longer reachable. AMF 621 indicates the bearer failure to PCF 625. PCF 625 generates a bearer failure message that includes an error code that characterizes the error type and transfers the bearer failure message to P-CSCF 631.

In response to the bearer failure message, P-CSCF 631 retrieves the session type for the multimedia session requested by MO UE 601 from memory. P-CSCF 631 reads the error code included in the bearer failure message and determines bearer failure was caused by UE 601 being unreachable. P-CSCF 631 inputs the session type and error type into the decision matrix hosted by P-CSCF 631. The decision matrix outputs an indication that the multimedia session cannot continue over the default bearer based on the session type and the error type. In response, P-CSCF 631 decides to end the multimedia session and informs S-CSCF 633 that bearer setup failed. P-CSCF 631 transfers an end session command for delivery to UE 601 to UPF 623. UPF 623 forwards the end session command to UE 601 over RAN 610. P-CSCF 631 indicates the call failure to MT UE 602 over data network 641.

Figure 11:
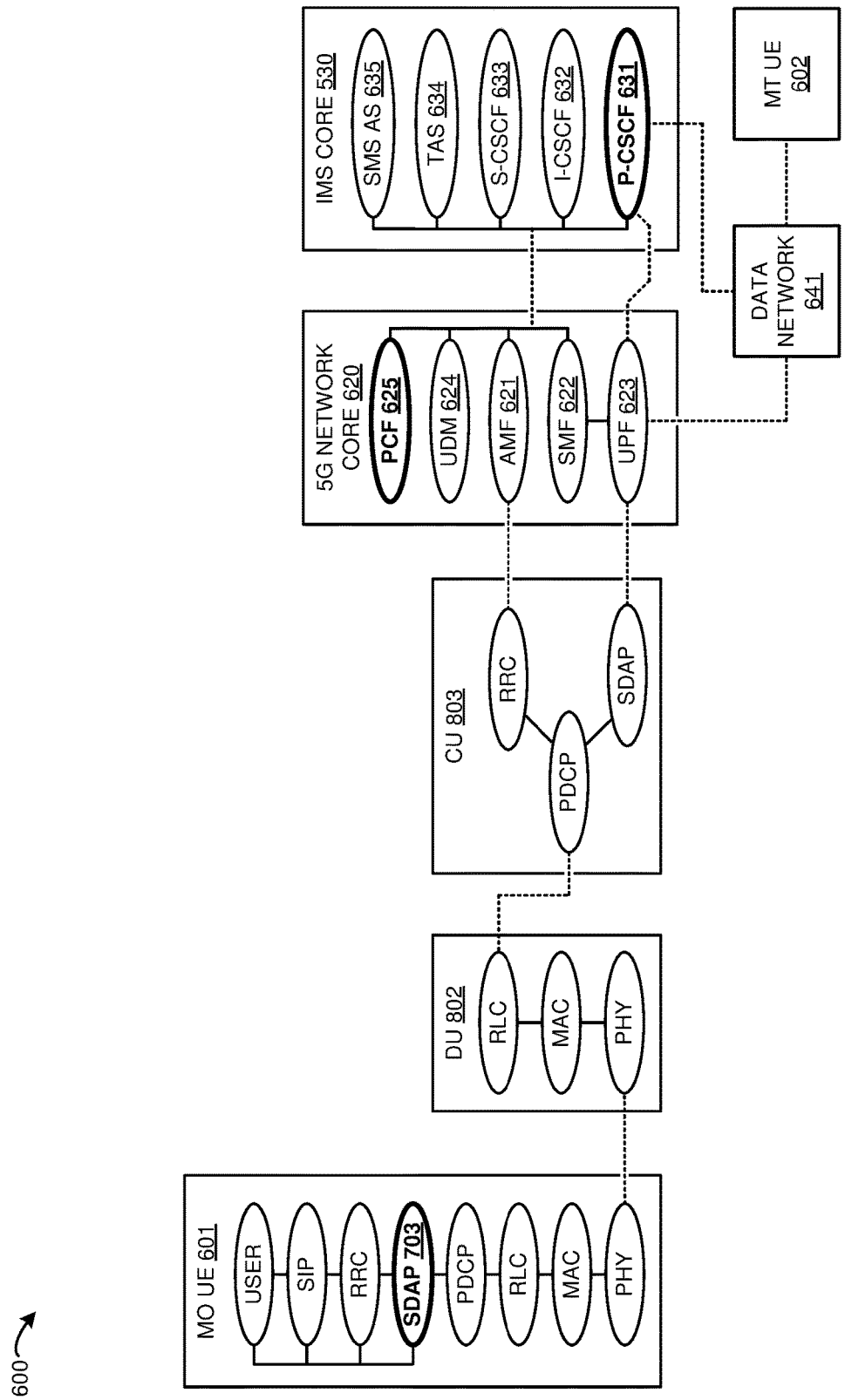
FIG. 11 illustrates an exemplary operation of the 5G wireless communication network to maintain multimedia sessions in response to bearer failure.

FIG. 11 illustrates an exemplary operation of 5G communication network 600 to maintain multimedia sessions in response to bearer failure. The operation may vary in other examples. In some examples, UE 601 wirelessly attaches to RAN 610 and the RRC in UE 601 exchanges attachment signaling with the RRC in CU 803 over the PDCPs, RLCs, MACs, and PHYs to establish a default radio signaling bearer. Once the signaling bearer is established, the RRC in UE 601 transfers a registration request for network core 620 to the RRC in CU 803 over the PDCPs, RLCs, MACs, and PHYs. The RRC in CU 803 forwards the registration request to AMF 621. AMF 621 transfers an identity request for UE 601 to the RRC in CU 803. The RRC in CU 803 forwards the identity request to the RRC in UE 601 over the PDCPs, RLCs, MACs, and PHYs. The RRC in UE 601 indicates the identity of UE 601 to the RRC in CU 803 over the PDCPs, RLCs, MACs, and PHYs. Exemplary identity indications comprise Subscriber Concealed Identifier (SUCI) and Subscriber Permanent Identifier (SUPI). The RRC in CU 803 forwards the identity indication to AMF 621. AMF 621 interacts with the other network functions to authenticate and authorize UE 601 for wireless data service.

Responsive to the authentication and authorization, AMF 621 retrieves service metrics for MO UE 601 from UDM 624 and selects a network slice for UE 601. The UDM pulls the requested data from a subscriber profile for UE 601 and transfers the data to AMF 621. AMF 621 selects SMF 622 to serve UE 601 based on the service metrics. SMF 622 selects P-CSCF 631 and UPF 623 based on the service metrics and network slice. SMF 622 indicates the network addresses for UPF 623 and P-CSCF 631 to AMF 621. AMF 621 generates UE context comprising the slice ID, the network addresses, the service attributes, and the like. AMF 621 transfers the UE context to the RRC in CU 803. The RRC in CU 803 transfers the UE context to the RRC in UE 601 over the PDCPs, RLCs, MACs, and PHYS.

Responsive to network registration, UE 601 initiates an IMS registration procedure to register with IMS core 630. The RRC in UE 601 drives the SIP application to generate a SIP registration message. SDAP 703 in UE 601 addresses the SIP registration message using the network address for P-CSCF 631 in the UE context. SDAP 703 transfers the SIP registration message to the SDAP in CU 803 over the PDCPs, RLCs, MACs, and PHYs. The SDAP in CU 803 transfers the SIP registration message to UPF 623. UPF 623 transfers the SIP registration to P-CSCF 631 using the network address for P-CSCF 631.

P-CSCF 631 receives the registration request and retrieves the network address for I-CSCF 632 using a DNS query. P-CSCF 631 forwards the registration request to I-CSCF 632. I-CSCF 632 requests S-CSCF selection criteria from UDM 624. UDM 624 identifies available S-CSCFs in IMS core 630, including S-CSCF 633. I-CSCF 632 selects S-CSCF 633 to register UE 601 and forwards the registration request to S-CSCF 633. S-CSCF 633 retrieves user authentication data like random numbers, authentication tokens, signed results, and secret keys from UDM 624. S-CSCF 633 uses the retrieved authentication data to verify the identity of UE 601 before registering UE 601 for IMS service. S-CSCF 633 exchanges registration signaling for UE 601 with P-CSCF 631. P-CSF 631 exchanges the registration signaling with UDM 624. UDM 624 exchanges the registration signaling with the SDAP in CU 803. The SDAP in CU 803 exchanges the registration signaling with SDAP 703 in UE 601 over the PDCPs, RLCs, MACS, and PHYs. SDAP 703 indicates the registration signaling to the RRC in UE 601. Upon authentication, S-CSCF 633 registers UE 601 for IMS services.

Once registered with IMS core 630, a user application in UE 601 executes to initiate an IMS instant messaging session with UE 602. The user application drives the SIP application to generate an MO SIP invite for UE 602. The SIP application generates the SIP invite and includes the phone number for UE 602 in the invite. The SIP application transfers the invite to the RRC which directs SDAP 703 to transfers the SIP invite to IMS core 630 to request the instant messaging session. SDAP 703 in UE 601 transfers the SIP invite to the SDAP in RAN 610 over the PDCPs, RLCs, MACs, and PHYs along the default radio data bearer. The SDAP in RAN 610 forwards the SIP invite to P-CSCF 631 over UPF 623. P-CSCF 631 receives the SIP invite and examines the SIP invite to determine that the requested session type is an instant messaging session. P-CSCF 631 caches the session type in memory and transfers the SIP invite to S-CSCF 633. S-CSCF 633 translates phone number for MT UE 602 included in the SIP invite into the registered IP address for MT UE 602. S-CSCF 633 replaces the phone number for MT UE 602 with the IP address in the SIP invite and returns the SIP invite to P-CSCF 631. P-CSCF 631 transfers the SIP invite for delivery to MT UE 602 over data network 641.

MT UE 602 accepts the MO SIP invite to participate in the instant messaging session with MO UE 601. MT UE 602 indicates the acceptance to P-CSCF 631 over data network 641. P-CSCF 631 notifies S-CSCF 633 of the acceptance and transfers the acceptance message to the SDAP in RAN 610 over UPF 623. The SDAP in RAN 610 transfers the acceptance message to SDAP 703 in UE 601 over the PDCPs, RLCs, MACs, and PHYs using the default data radio bearer. S-CSCF 633 directs SMS AS 635 to support the instant messaging session and directs P-CSCF 631 to request the dedicated bearer for the instant messaging session. P-CSCF 631 transfers a dedicated bearer request for UE 601 to PCF 625 over their N5 interface.

PCF 625 receives the request and directs AMF 621 to reserve the requested radio resources to create the dedicated bearer for UE 601. AMF 621 transfers a bearer setup command to the RRC in RAN 610 to allocate radio resources to form the dedicated data radio bearer for UE 601. The RRC in RAN 610 determines the amount of needed radio resources to form the dedicated radio data bearer for UE 601 is not available. In response, the RRC in RAN 610 transfers a bearer failure message to AMF 621 which forwards the message to PCF 625. The bearer failure message comprises an error code that indicates bearer setup failed due to lack of radio resources. PCF 625 transfers the bearer failed message to P-CSCF 631 over their N5 interface.

In response to the bearer failure message, P-CSCF 631 retrieves the session type for the multimedia session requested by MO UE 601 from memory. P-CSCF 631 reads the error code included in the bearer failure message to determine the error type. P-CSCF 631 enters the error type and session type into the decision matrix the correlates error and session types to default bearer suitability. The decision matrix generates an indication that the default bearer can be used to support the instant messaging session because the error type is survivable, and the session type does not require more resources than the default data radio bearer can support. In response, P-CSCF 631 decides to not end the multimedia session and informs S-CSCF 633 that bearer setup is complete.

S-CSCF 633 interfaces with data network 641 and UPF 623 over P-CSCF 631 to establish and end-to-end RTP connection between MO UE 601 and MT UE 602 to carry the user data for the instant messaging session. P-CSCF 631 directs UPF 623 to route uplink and downlink user data of the session over the default radio data bearer to UE 601 in response to the output from the decision matrix. S-CSCF 633 transfers an indication for MO UE 601 that the instant messaging session may begin to P-CSCF 631. P-CSCF 631 delivers the indication to the SDAP in RAN 610 over UPF 623. The SDAP in RAN 610 transfers the indication to SDAP 703 in UE 610 over the PDCPs, RLCs, MACs, and PHYS.

S-CSCF 633 transfers another indication for MT UE 602 that the instant messaging session may begin to P-CSCF 631. P-CSCF 631 delivers the indication to MT UE 602 over data network 641. MT UE 602 receives the indication and rings its user to notify them of the instant messaging session. When the user of MT UE 602 answers the instant messaging session request, MT UE 602 transfers an answer indication to P-CSCF 631 which forwards the answer indication to the SDAP in RAN 610 over UPF 623. The SDAP in RAN 610 delivers the answer indication to SDAP 703 in MO UE 601 over the PDCPs, RLCs, MACs, and PHYs. SDAP 703 in MO UE 601 acknowledges the answer indication to MT UE 602 to signify that the instant messaging session may enter chat mode.

MT UE 602 generates and transfers user data for the instant messaging session to data network 641. Data network 641 transfers user data to UPF 623. UPF 623 transfers the user data over the default radio bearer IP tunnel to the SDAP in RAN 610. The SDAP in RAN 610 delivers the downlink user data over the PDCPs, RLCs, MACs, and PHYs via the default data radio bearer to SDAP 703 in MO UE 601. SDAP 703 detects the downlink user data for the instant messaging session is being received over the default radio data bearer. In response, SDAP 703 determines the instant messaging session is being held on the default bearer. The user application in MO UE 601 generates additional user and SDAP 703 transfers the additional user data as uplink over the PDCPs, RLCs, MACs, and PHYs via the default data radio bearer to the SDAP in RAN 610. The SDAP in RAN 610 transfers the additional user data to UPF 623. UPF 623 routes the additional user data to data network 641 which delivers the user data to MT UE 602.

The wireless data network circuitry described above comprises computer hardware and software that form special-purpose network circuitry to maintain multimedia sessions in response to bearer failure. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to maintain multimedia sessions in response to bearer failure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to maintain multimedia sessions in response to bearer failure, the method comprising:
   in response to a multimedia session request for a user device received over a default bearer, requesting a dedicated bearer to serve the requested multimedia session;
   receiving an error message that comprises an error code indicating the dedicated bearer could not be established;
   determining a session type for the requested multimedia session and an error type for the error code;
   determining the default bearer can support the requested multimedia session based on the session type and the error type;

in response to determining the default bearer can support the requested multimedia session, maintaining the default bearer for the user device and establishing the requested multimedia session over the default bearer.

2. The method of claim 1 wherein:
requesting the dedicated bearer to serve the requested multimedia session comprises transferring a dedicated bearer request over an N5 interface to a Policy Control Function (PCF); and
receiving the error message comprises receiving the error message over the N5 interface from the PCF.

3. The method of claim 1 wherein:
requesting the dedicated bearer to serve the requested multimedia session comprises transferring a dedicated bearer request over an Rx interface to a Policy and Charging Rules Function (PCRF); and
receiving the error message comprises receiving the error message over the Rx interface from the PCRF.

4. The method of claim 1 wherein the multimedia session request comprises a Mobile Originating Session Initiation Protocol (MO SIP) invite.

5. The method of claim 1 wherein the requested multimedia session comprises a voice call.

6. The method of claim 1 wherein the requested multimedia session comprises a video call.

7. A wireless communication network to maintain multimedia sessions in response to bearer failure, the wireless communication network comprising:
Call Session Control Function (CSCF) circuitry that:
requests a dedicated bearer to serve a requested multimedia session in response to a multimedia session request for a user device received over a default bearer;
receives an error message that comprises an error code indicating the dedicated bearer could not be established;
determines a session type for the requested multimedia session and an error type for the error code;
determines the default bearer can support the requested multimedia session based on the session type and the error type;
maintains the default bearer for the user device and establishes the requested multimedia session over the default bearer when the default bearer can support the requested multimedia session.

8. The wireless communication network of claim 7 further comprising Policy Control Function (PCF) circuitry that:
transfers the error message over an N5 interface to the CSCF circuitry; and wherein the CSCF circuitry further:
transfers a dedicated bearer request over the N5 interface to the PCF circuitry; and
receives the error message over the N5 interface from the PCF circuitry.

9. The wireless communication network of claim 7 further comprising Policy and Charging Rules Function (PCRF) circuitry that:
transfers the error message over an Rx interface to the CSCF circuitry; and wherein the CSCF circuitry further:
transfers a dedicated bearer request over the Rx interface to the PCRF circuitry; and
receives the error message over the Rx interface from the PCRF circuitry.

10. The wireless communication network of claim 7 wherein the multimedia session request comprises a Mobile Originating Session Initiation Protocol (MO SIP) invite.

11. The wireless communication network of claim 7 wherein the requested multimedia session comprises a voice call.

12. The wireless communication network of claim 7 wherein the requested multimedia session comprises a video call.

13. One or more non-transitory computer-readable storage media having program instructions stored thereon to maintain multimedia sessions in response to bearer failure, wherein the program instructions, when executed by a computing system, direct the computing system to perform operations, the operations comprising:
in response to a multimedia session request for a user device received over a default bearer, requesting a dedicated bearer to serve the requested multimedia session;
receiving an error message that comprises an error code indicating the dedicated bearer could not be established;
determining a session type for the requested multimedia session and an error type for the error code;
determining the default bearer can support the requested multimedia session based on the session type and the error type;
in response to determining the default bearer can support the requested multimedia session, maintaining the default bearer for the user device and establishing the requested multimedia session over the default bearer.

14. The non-transitory computer-readable storage media of claim 13 wherein:
requesting the dedicated bearer to serve the requested multimedia session comprises transferring a dedicated bearer request over an N5 interface to a Policy Control Function (PCF); and
receiving the error message comprises receiving the error message over the N5 interface from the PCF.

15. The non-transitory computer-readable storage media of claim 13 wherein:
requesting the dedicated bearer to serve the requested multimedia session comprises transferring a dedicated bearer request over an Rx interface to a Policy and Charging Rules Function (PCRF); and
receiving the error message comprises receiving the error message over the Rx interface from the PCRF.

16. The non-transitory computer-readable storage media of claim 13 wherein the multimedia session request comprises a Mobile Originating Session Initiation Protocol (MO SIP) invite.

17. The non-transitory computer-readable storage media of claim 13 wherein the requested multimedia session comprises one of a voice call or a video call.

18. The method of claim 1 wherein determining the default bearer can support the requested multimedia session based on the session type and the error type comprises:
hosting a data structure that correlates multimedia session default bearer support with session types and error types;
inputting the session type and the error type into the data structure; and
obtaining an output from the data structure that indicates the default bearer can support the requested multimedia session.

19. The wireless communication network of claim 7 wherein the CSCF circuitry further:
hosts a data structure that correlates multimedia session default bearer support with session types and error types;

inputs the session type and the error type into the data structure; and obtains an output from the data structure that indicates the default bearer can support the requested multimedia session.

20. The non-transitory computer-readable storage media of claim 13 wherein determining the default bearer can support the requested multimedia session based on the session type and the error type comprises:

hosting a data structure that correlates multimedia session default bearer support with session types and error types;

inputting the session type and the error type into the data structure; and obtaining an output from the data structure that indicates the default bearer can support the requested multimedia session.

\* \* \* \* \*